June 30, 1925.

T. TORDA 1,544,113

ALTERNATING CURRENT INDUCTION MOTOR

Filed June 7, 1922          2 Sheets-Sheet 1

Inventor:
Theodore Torda
By
Langner, Parry, Card & Langner
Attys

June 30, 1925. 1,544,113
T. TORDA
ALTERNATING CURRENT INDUCTION MOTOR
Filed June 7, 1922 2 Sheets-Sheet 2

Inventor:
Theodore Torda
By
Langner, Parry, Card & Langner
Attys

Patented June 30, 1925.

1,544,113

UNITED STATES PATENT OFFICE.

THEODORE TORDA, OF BUDAPEST, HUNGARY.

ALTERNATING-CURRENT INDUCTION MOTOR.

Application filed June 7, 1922. Serial No. 566,559.

*To all whom it may concern:*

Be it known that I, THEODORE TORDA, a citizen of Hungary, residing at Budapest, in Hungary, have invented certain new and useful Improvements in Alternating-Current Induction Motors, of which the following is a specification.

My invention which relates to alternating current induction motors and has among its objects the compensation of phase displacement without materially increasing the dimensions and weight of the motor will be best understood from the following description when read in light of the accompanying drawings of a specific embodiment of my invention selected for illustrative purposes, while the scope of my invention will be more particularly pointed out in the appended claims.

It is well known that the phase-displacement of induction motors can be compensated according to the method proposed by Leblanc by connecting the induction motor in cascade with a second machine having an armature winding provided with a commutator and a number of brushes sliding thereon corresponding to the number of phases and connected with the brushes sliding on the slip-rings of the rotor of the induction motor.

Such twin-machines had comparatively small opportunities owing to the increased costs and bulk, in spite of the increase of the power-factor having become a very imperious need. It may be understood, that in the current distribution plants the inductive load increases from day to day with respect to the resistive load owing to the rapid increase of the number of motors used by the customers. Hence a considerable percentage of the load of the distributing plant consists of the wattless currents hindering an economic utilization of the distributing plant.

As the majority of the motors causing the wattless currents are of small or medium size, affording no possibility at all of the Leblanc-method, it is very important to provide a compensation of the phase-displacement increasing neither the bulk nor the costs of the motors.

According to my invention I provide within the active iron besides the normal polyphase rotor-winding connected with the slip-rings, a winding connected to a commutator and designed for an output corresponding to the magnetizing energy of the motor, the brushes of the commutator being connected to the polyphase winding of the rotor and means being provided to prevent the mutual induction of the two rotor windings having any detrimental effect.

Figure 1:
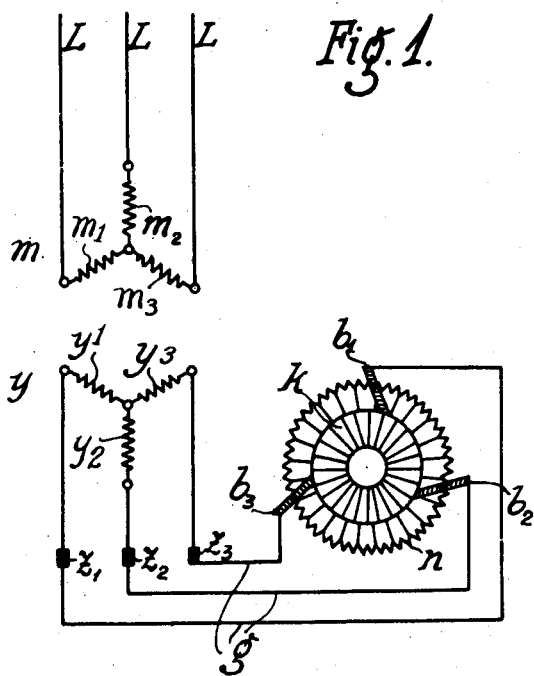
Fig. 1 is a diagram showing the connections of a motor according to my invention.

Referring to Fig. 1 $m$ is the three-phase primary winding of the stator of the induction motor having the branches $m_1$, $m_2$, and $m_3$ fed from the line L, and $y$ the three-phase-secondary winding of the rotor having the branches $y_1$, $y_2$, and $y_3$ connected to the slip-rings $z_1$, $z_2$, $z_3$, respectively; $n$ is the compensating commutator-winding of the rotor sharing the active iron with the rotor winding $y$ and connected to the commutator $k$. $b_1$, $b_2$, $b_3$ are brushes corresponding to the three phases of the secondary winding $y$ sliding on the commutator $k$ and connected by means of the leads $g$ to the brushes sliding on the slip-rings $z_1$, $z_2$, $z_3$.

It is essential that the ratio of the pole-numbers of the induction motor and of the compensating winding should be either an even number or at least a fraction having an even number in its numerator or in its denominator.

Figure 2:
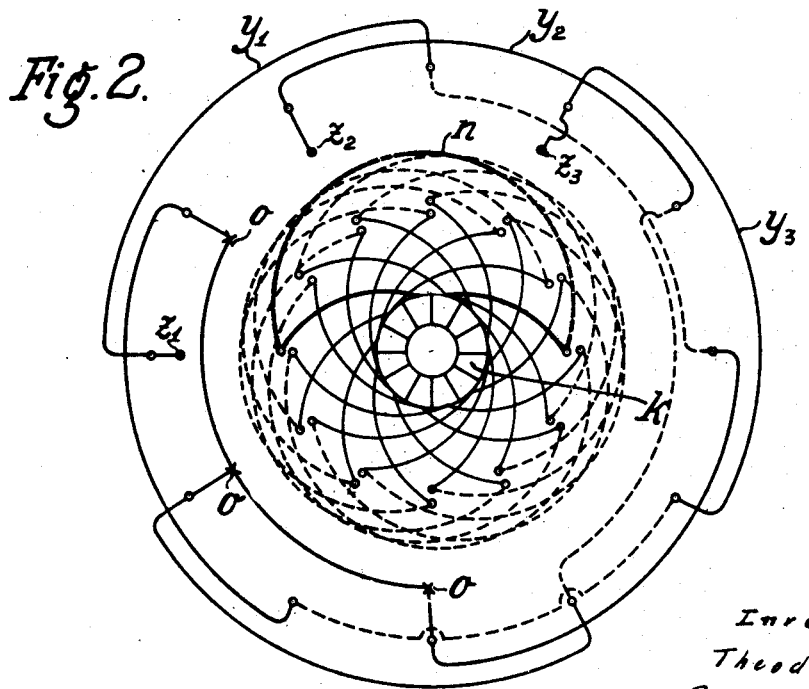
Fig. 2 is a diagram of a 4-pole three-phase rotor winding with a two-pole compensating winding.

Fig. 2 shows a diagram of the two rotor windings. The slip-ring winding of the rotor is a four-pole three-phase-winding, the windings of the several phases $y_1$, $y_2$ and $y_3$ being connected at their one end to the common neutral point $o$ and at their other end to the three slip-rings $z_1$, $z_2$ and $z_3$ respectively.

The compensating winding $n$ is a commutator-winding wound for two poles as will be seen from the one turn drawn with heavy lines.

The ratio of the two pole numbers 4:2 is an even number.

The rotor current with the slip-frequency is fed by means of the brushes $b_1$, $b_2$, $b_3$ to the compensating winding $n$ and will generate a magnetic field in the active-iron of the motor. Owing to the action of the commutator, the field generated by the compensating winding will revolve at slip frequency and will thus lag with respect to the commutator winding.

As however the compensating winding rotates with respect to the field generated by this winding with a speed exceeding the synchronism corresponding to the slip-frequency, the said field will induce electromotive forces in the compensating winding which will generate a wattless current in the circuit formed by the compensating winding, the brushes $b_1$—$b_3$, leads $g$, slip-rings $z_1$—$z_3$ and the secondary winding $y$ of the rotor. If the ampere-turns resulting from this wattless current and the number of ampere turns of the rotor winding $y$ are equal to the ampere turns due to the wattless component of the stator current if the motor is uncompensated the phase-displacement will be totally compensated and the power-factor is the unity. If the wattless ampere-turns of the rotor are greater than the ampere-turns due to the entire wattless component of the stator current, the motor will be over-compensated, so that the motor will deliver into the line L a leading wattless current and improve the power-factor of the line.

The mutual induction of the two rotor windings may be eliminated by using different numbers of poles for the two rotor windings, the ratio of the said numbers of poles being an even one, for example, 4:2, as in the described example.

The ratio of the pole-numbers is however not limited to an even number as it may be a fraction having but one even number either as numerator or as denominator. For instance the motor may be wound for six poles and the compensating winding for four poles giving a ratio $6:4=\frac{3}{2}$. In no case can the ratio be an odd number f. i. 2:6 or 6:2=3.

To attain the above specified compensation it is important that the saturation in the magnetic field generated by the ampere-turns of the compensating winding be high enough to secure substantially constant compensating E. M. forces throughout a large range of the load of the motor. Owing to the circumstance that according to my invention the compensating field is superposed to the field of the induction motor, the said requirement is easily fulfilled.

Figure 3:
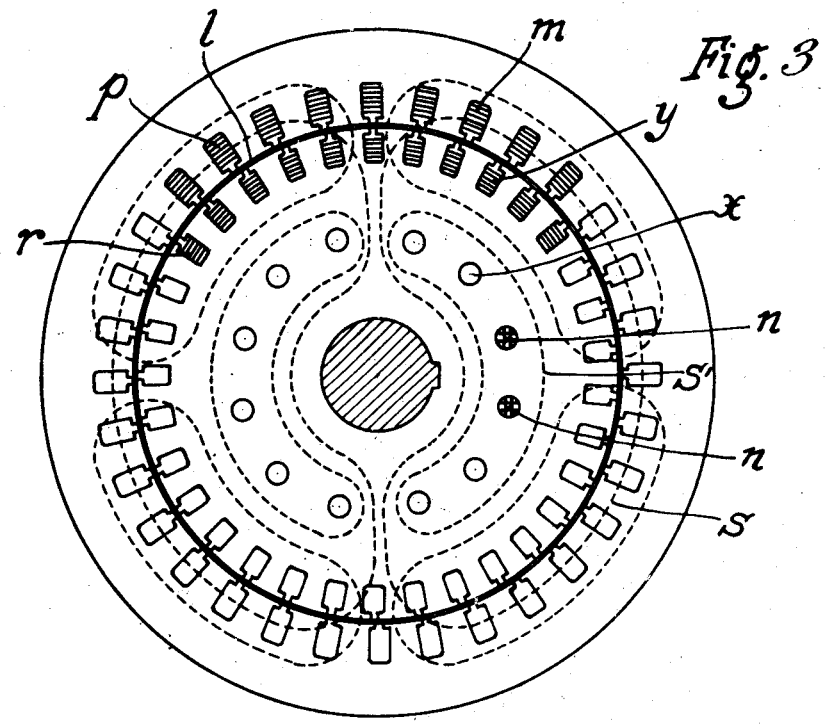
Fig. 3 is a sectional view of the motor showing an arrangement of the compensating winding within the rotor.

With reference to Fig. 3, $p$ are the slots of the stator receiving the primary winding $m$, and $r$ are the slots of the rotor receiving the secondary or slip-ring winding $y$ of the motor. $x$ are channels arranged within the active iron of the rotor on a smaller radius, than the slots $r$. The compensating winding $n$ is located in the said channels $x$.

As will be readily seen, only a part $s$ of the flux generated by the compensating winding $n$ is forced through the stator-iron, while the remainder $s'$ of the said flux will be closed through the zone between the slots $r$ and the channels $x$.

The advantages of this arrangement are the following:

As has been already stated, it is important to have a great saturation in the iron conducting the flux generated by the compensating winding. The saturation of the stator however cannot be a high one owing to the comparatively high frequency of the primary current. In the rotor the magnetization has a small frequency so that the iron losses are no hindrance to the saturation of the iron.

As the motors of smaller or medium size will be wound preferably for 4 poles and the compensating winding accordingly for 2 poles, the dimensions of the coil-heads will become substantially smaller by decreasing the diameter of the commutator-winding; hence the quantity of the copper required by the compensating winding will be diminished.

Figure 4:
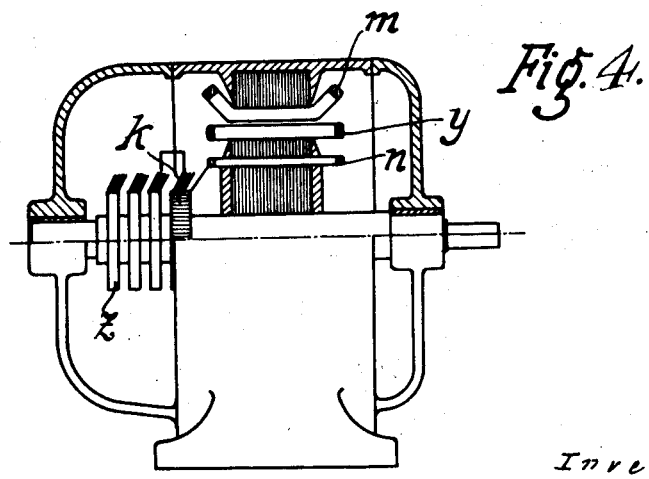
Fig. 4 is an elevation partly in section of a motor corresponding to the arrangement shown in Fig. 3.

As the compensated motor according to Figs. 3 and 4 differs from the normal type only in having an additional row of channels and a small commutator of few segments, requiring only very little space, a uniform type of motor can be manufactured with the holes stamped into the iron lamellæ used for the rotor. If it is not desired to provide for the compensation of the phase-displacement, the motor will be completed as an induction motor of the usual type, the channels $x$ interfering in no way with its function, and improving the ventilation of the rotor. If however the compensation is required, it is only necessary to insert the turns of the compensating winding $n$ into the channels $x$ and to apply the commutator, for which the normal motor types afford enough place for the insertion of the commutator of very reduced dimensions.

The described compensation allows to increase the output of the motor with a slight plus of conductor material without increase of the dimensions of the iron.

Owing to the correction of the phase-displacement the number of slots provided for the windings can be substantially reduced with respect to the number of slots required in uncompensated motors, allowing a substantial increase in the amount of conductors placed in the iron of given diameter. In this way the output of a motor of given iron dimensions can be further increased.

The increase of output due to the compensation will balance the costs of the additional compensating winding and of the commutator.

It will thus be seen that there are herein described induction-motors with compensation of the phase-displacement in which the several features of this invention are embodied and which obtain the various objects of my invention and are well suited to meet the requirement of practical use.

As many changes could be made in the above constructions and many apparently widely different embodiments of this invention could be made without departing from the scope thereof, it is intended that all matter contained in the above specification or shown in the accompanying drawings shall be interpreted as illustrative and not in a limiting sense.

Thus the three-phase windings may be in delta connection, further the stator of the motor may be provided with a single-phase primary winding and the secondary winding of the rotor may be a two, three or other polyphase winding.

Having now fully described and ascertained my said invention and the manner in which it is to be performed, I declare, that what I claim is:

1. In an asynchronous induction machine, a stator, a rotor, a polyphase rotor winding for the rotor and connected with slip-rings, a commutator winding and commutator arranged on the rotor, brushes placed in polyphase arrangement for co-operating with the said commutator, brushes for co-operating with the said slip-rings, means connecting the brushes associated with the slip-rings with the brushes associated with the commutator, and means to reduce the mutual induction of the two rotor windings.

2. In an asynchronous induction machine, a stator, a rotor, a polyphase rotor winding for the rotor and connected with slip-rings, a commutator winding arranged on the rotor, a commutator, brushes in polyphase arrangement for co-operating with the said commutator, brushes for co-operating with the said slip-rings, means connecting the brushes associated with the slip-rings to the brushes associated with the commutator, the ratio of the numbers of poles of the two said rotor windings being an even integer or a fraction, which, when reduced to its lowest terms has either the numerator or denominator even.

3. In an alternating current induction motor, a stationary and a rotary active iron body constituting respectively, a stator and a rotor, a primary motor winding on the stator, a polyphase secondary motor winding on the rotor, slip-rings on the rotor connected with the polyphase winding of the rotor, a compensating winding located on a smaller radius than that of the polyphase winding of the rotor and in the active iron of the rotor, an annular zone of iron between the polyphase winding and the compensating winding of the rotor, a commutator on the rotor connected to the said compensating winding, and brushes sliding on the said commutator and connected to the several phases of the polyphase rotor winding.

4. In an asynchronous induction machine, a stator, a rotor, a polyphase rotor winding connected with slip-rings, a commutator winding having a number of ampere turns to correspond substantially to the ampere turns due to the wattless current of the stator, said commutator winding being arranged on the said rotor, a commutator, brushes in polyphase arrangement for co-operating with the said commutator, brushes for co-operating with the said slip-rings, means connecting the brushes associated with the slip-rings to the brushes associated with the commutator, and means to reduce the mutual induction of the two rotor windings.

5. In an asynchronous induction machine, a stator, a rotor, a polyphase rotor winding for the rotor and connected with slip-rings, a commutator, a commutator winding having a number of ampere turns to correspond substantially to the ampere turns due to the wattless current of the stator, said commutator winding being arranged on the said rotor, brushes in polyphase arrangement co-operating with the said commutator, brushes for co-operating with the said slip-rings, means to connect the brushes associated with the slip-rings, to the brushes associated with the commutator, and means to reduce the mutual induction of the two rotor windings to a value preventing undue sparking on the commutator.

6. In an asynchronous induction machine, a stator, a rotor, a polyphase rotor winding for the rotor and connected with slip-rings, a commutator, a commutator winding having a number of ampere turns to correspond substantially to the ampere turns due to the wattless current of the stator, said commutator winding being arranged on the said rotor, brushes in polyphase arrangement for cooperating with the said commutator, brushes for co-operating with the said slip-rings, means to connect the brushes associated with the slip-rings to the brushes associated with the commutator, the ratio of the numbers of poles of the two rotor winding being an even integer, or a fraction which, when reduced to it slowest terms, has either the numerator or denominator even.

7. In an alternating current induction motor a stationary and a rotary active iron body, a primary motor-winding on the one of the said iron bodies, a polyphase secondary motor winding on the other iron-body, slip rings on the rotor connected with the motor winding of the rotor, a compensating winding located on a smaller radius than the motor winding of the rotor in the active iron of the rotor, and annular zone of iron between the motor-winding and the compensating winding of the rotor, a commutator on the rotor connected to the said compensating winding and brushes sliding on the said commutator and connected to the several phases of the secondary motor winding.

8. An asynchronous induction machine having in combination, a stator, a stator winding, a rotor having an iron body, a polyphase rotor winding on said rotor, a commutator winding on said rotor having its ampere turns substantially the same as the ampere turns of the stator winding corresponding to the wattless current of the stator winding, said commutator winding being within the active iron of said rotor body at a smaller radius than said rotor winding and separated therefrom by an annular zone of iron, a commutator on said rotor for said commutator windings, brushes in polyphase arrangement cooperating with said commutator, and means including slip rings and cooperating brushes for connecting said brushes cooperating with said commutator to each phase of said rotor winding.

9. An asynchronous induction machine having in combination, a stator with a polyphase primary winding, a rotor carrying a polyphase rotor winding and a commutator winding, said commutator winding being separated from said rotor winding by a zone of iron and having its ampere turns substantially the same as the ampere turns of the stator winding corresponding to the wattless current of the stator winding, a commutator for said commutator winding having brushes in polyphase arrangement, and means including slip rings and brushes for connecting said brushes of said commutator with the respective phases of said rotor winding.

In testimony whereof I affix my signature in presence of two witnesses.

Dr. THEODORE TORDA.

Witnesses:
Charles Medgye,
Eugene Harsany.